United States Patent
Aumann et al.

(10) Patent No.: US 9,555,720 B2
(45) Date of Patent: Jan. 31, 2017

(54) TRANSPORT DEVICE WITH LINEAR-MOTOR DRIVE

(71) Applicant: Uhlmann Pac-Systeme GmbH & Co. KG, Laupheim (DE)

(72) Inventors: Thomas Aumann, Dettingen (DE); Joerg Riekenbrauck, Schwendi (DE); Wolfgang Krahl, Laupheim (DE); Roberto Linke, Neu-Ulm (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 146 days.

(21) Appl. No.: 14/515,412

(22) Filed: Oct. 15, 2014

(65) Prior Publication Data

US 2015/0027338 A1 Jan. 29, 2015

Related U.S. Application Data

(63) Continuation of application No. PCT/EP2013/053258, filed on Feb. 19, 2013.

(30) Foreign Application Priority Data

Apr. 18, 2012 (DE) ........................ 10 2012 103 378

(51) Int. Cl.
*B60L 13/03* (2006.01)
*B65G 54/02* (2006.01)
(Continued)

(52) U.S. Cl.
CPC ................ *B60L 13/03* (2013.01); *B61B 13/00* (2013.01); *B61B 13/04* (2013.01); *B61C 3/00* (2013.01); *B65G 54/02* (2013.01)

(58) Field of Classification Search
CPC .......... B60L 13/00; B60L 13/03; B61B 13/00; B61B 13/04; B61C 3/00
See application file for complete search history.

(56) References Cited

U.S. PATENT DOCUMENTS

| 4,867,579 A | 9/1989 | Gallone |
| 4,884,898 A * | 12/1989 | Magnuson ............... F16C 29/12 384/52 |

(Continued)

FOREIGN PATENT DOCUMENTS

| DE | 102010028055 A1 | 10/2011 |
| EP | 0517684 A2 | 12/1992 |

(Continued)

OTHER PUBLICATIONS

International Preliminary Report on Patentability from PCT/EP2013/053258.
International Search Report from PCT/EP2013/053258.

*Primary Examiner* — R. J. McCarry, Jr.
(74) *Attorney, Agent, or Firm* — Brinks Gilson & Lione

(57) ABSTRACT

The transport device for conveying products has several symmetrically configured, movable carriages having inverted U-shape, each carriage having permanent magnets, also has an endless guide rail for guiding the carriages and a linear-motor drive device to drive the carriages. Each symmetric half of each carriage has three running rollers projecting inwardly from sidepieces of the carriage. The three running rollers of the first half rest on first and second guide surfaces on a first side wall of the guide rail, and the three running rollers of the second half rest on first and second guide surfaces on the second side wall of the guide rail. Each guide surface is arranged at an acute angle to a longitudinal center plane of the transport device, and the two guide surfaces of each side wall are at an angle of 80° to 100° to each other.

7 Claims, 6 Drawing Sheets

(51) Int. Cl.
*B61B 13/00* (2006.01)
*B61B 13/04* (2006.01)
*B61C 3/00* (2006.01)

(56) References Cited

U.S. PATENT DOCUMENTS

| | | | |
|---|---|---|---|
| 5,225,725 A | 7/1993 | Shiraki et al. | |
| 6,876,896 B1 | 4/2005 | Ortiz et al. | |
| 2004/0007921 A1* | 1/2004 | Harned | H02K 41/031 |
| | | | 310/12.01 |
| 2009/0095192 A1* | 4/2009 | Roop | B61B 13/12 |
| | | | 104/293 |
| 2012/0018282 A1 | 1/2012 | Loecht | |

FOREIGN PATENT DOCUMENTS

| | | |
|---|---|---|
| EP | 0577995 A2 | 1/1994 |
| EP | 2042759 A2 | 4/2009 |
| WO | WO 2010/086060 A1 | 8/2010 |

* cited by examiner

TRANSPORT DEVICE WITH LINEAR-MOTOR DRIVE

RELATED APPLICATIONS

The present patent application claims the benefit of priority to the following applications, and is a continuation of PCT Application No. PCT/EP2013/053258 filed Feb. 19, 2013, which claims priority to German Patent Application No. DE 102012103378.1, filed Apr. 18, 2012, the entire contents of each of which are incorporated herein by reference.

FIELD AND BACKGROUND OF THE INVENTION

The present invention relates to a transport device with linear motor drive.

Transport devices of this type have already been known for a long time and offer the advantage that the carriages or conveyor elements moved by the linear motor drive can be moved independently of each other, which results in considerable advantages over conventional mechanical transport devices.

One of the purposes served by these types of transport devices is to be found in, for example, the loading of packaging machines with products as known from U.S. Pat. No. 6,876,896 B1, for example, or from U.S. Pat. No. 5,225,725. In these cases, movable conveyor elements or carriages, each equipped with permanent magnets, are moved along a stationary, endless guide rail. The carriages are driven by means of stationary coils, arranged next to one another in a row, each of which is supplied individually with current, as a result of which local magnetic fields are created, which in turn generate a flow of force between the coils and the permanent magnets. By supplying current intelligently to the individual coils, a moving magnetic field can be generated, which can move each individual carriage independently of any of the other carriages which may be present. Because the guide rail is configured as a closed, endless circuit, problems occur particularly in the area of the curved sections as a result of the high frictional and inertial forces of the running rollers on the guide rail and as a result of the partly present play between the running rollers and the guide rail.

To arrive at an improvement here, a transport device has been proposed in WO 2010/086060 A1, in which each carriage is equipped with at least four running rollers, which are intended to ensure the solid support of the carriage on the guide rail without play. The rotational axes of three running rollers are arranged to be perpendicular to the plane defined by the movement of the carriage, whereas the rotational axis of the fourth running roller is parallel to this plane. All of the running rollers travel along guide surfaces which are configured in an internal recess in the guide rail.

SUMMARY

It is an object of the present invention to provide a transport device for conveying products which is easily accessible from the outside, has the simplest possible structure, and ensures the secure guidance of the carriage around the endless guide rail as it is driven by the linear-motor drive device.

According to one aspect of the invention, the transport device for conveying products comprises at least one movable carriage for conveying a product, a stationary endless guide rail for guiding the at least one carriage, and a linear-motor drive device for driving the at least one carriage. The at least one carriage comprises at least two permanent magnets, which interact with the linear motor drive device. In addition, the at least one carriage comprises a plurality of running rollers, which rest on the guide surfaces of the guide rail, which are arranged in various planes. When the at least one carriage moves, its running rollers roll over these guide surfaces. The carriage and the guide rail are symmetric to a longitudinal center plane of the transport device, and the carriage comprises two halves, which are mirror-symmetric to the longitudinal center plane. Each of the halves of the carriage comprises three running rollers, wherein the three running rollers of the first half of the carriage rest on two guide surfaces on a first side wall of the guide rail, and the three running rollers of the second half of the carriage rest on two guide surfaces on a second side wall of the guide rail. The first and second guide surfaces of each side wall of the guide rail are arranged at an acute angle to the longitudinal center plane, and the two guide surfaces of each side wall are arranged at an angle of 80° to 100° to each other.

With this arrangement, the carriage can be supported stiffly as it moves along the guide rail, wherein at the same time it is extremely easy to replace and to maintain each carriage.

The three running rollers of each half of the carriage are preferably configured in a tilted triangular arrangement, wherein two running rollers have parallel rotational axes and rest on the first guide surface, and wherein the third running roller has a rotational axis tilted at an angle of 80° to 100° to the rotational axes of the first two running rollers and rests on the second guide surface.

The acute angle between each guide surface and the longitudinal center plane is preferably 40° to 50°.

It is especially advantageous for the two guide surfaces of each side wall to be at an angle of substantially 90° to each other. The acute angle between each guide surface and the longitudinal center plane, furthermore, should be substantially 45°. With this configuration, it is possible to achieve the reliable guidance of the carriage in almost any imaginable travel situation.

In one embodiment of the transport device according to the teachings herein, the third running roller of each half of the carriage is arranged precisely in the middle between the two other running rollers relative to the longitudinal direction of the transport device.

It is also preferred that the two guide surfaces of each side wall of the guide rail are spaced apart and face each other.

In another preferred embodiment, the carriage comprises a substantially horseshoe-shaped or inverted U-shaped base body, from the sidepieces of which the running rollers inwardly project.

The permanent magnets are preferably arranged toward the end of the inside surfaces of the sidepieces on the inside surfaces of the sidepieces.

It contributes to the play-free support of the carriage if the sidepieces of the base body comprise a U-shaped recess in their middle section to form a web, on which the third running roller is supported. This web, because of its material properties, is slightly flexible. The web is configured and arranged in such a way that, when the carriage is in the working position, the third running roller is pressed slightly against the second guide surface, wherein the web is bent slightly outward.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
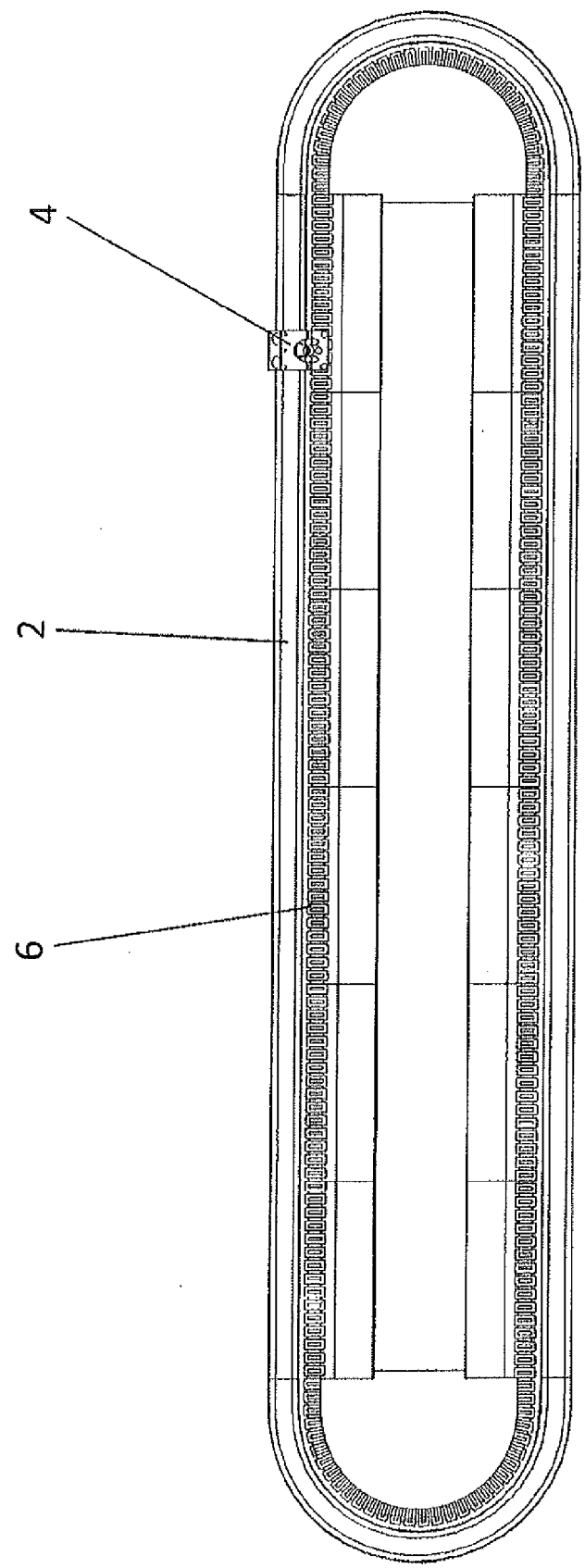
FIG. 1 is a schematic side view of an exemplary embodiment of a transport device according to the invention with an endless guide rail and a carriage, supported on and movable along the rail.

FIG. 1 shows one possibility for the basic structure of a transport device according to the invention for conveying products. The transport device comprises a stationary, endless guide rail 2 for guiding at least one movable carriage 4, which serves to convey a product and is moved along the guide rail 2. Even though only one carriage 4 is present in the exemplary case shown here, several carriages 4 will usually be moving around the same guide rail 2 at the same time. The material of the guide rail 2 and of the carriage 4 is preferably aluminum.

Figure 2:
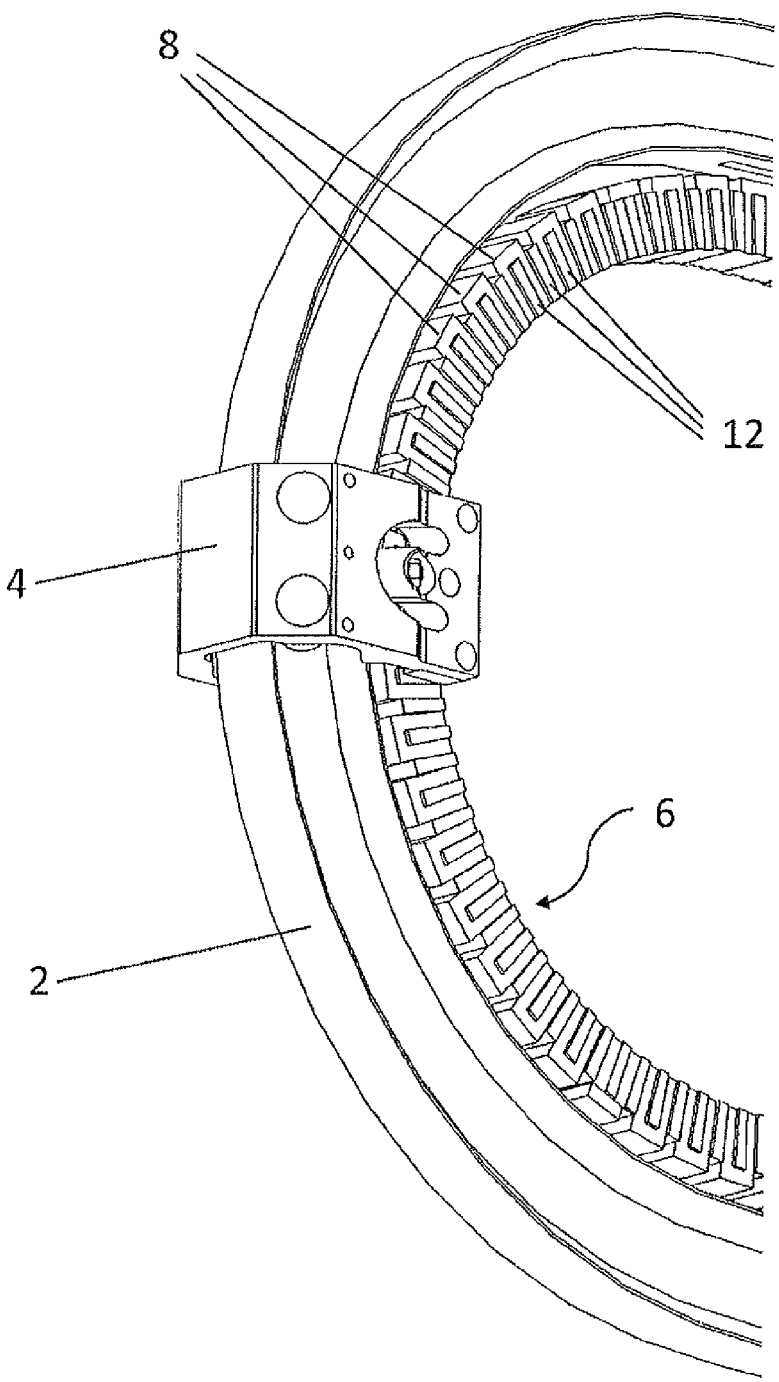
FIG. 2 is an enlarged perspective view of a curved section of the transport device of FIG. 1.
Figure 3:
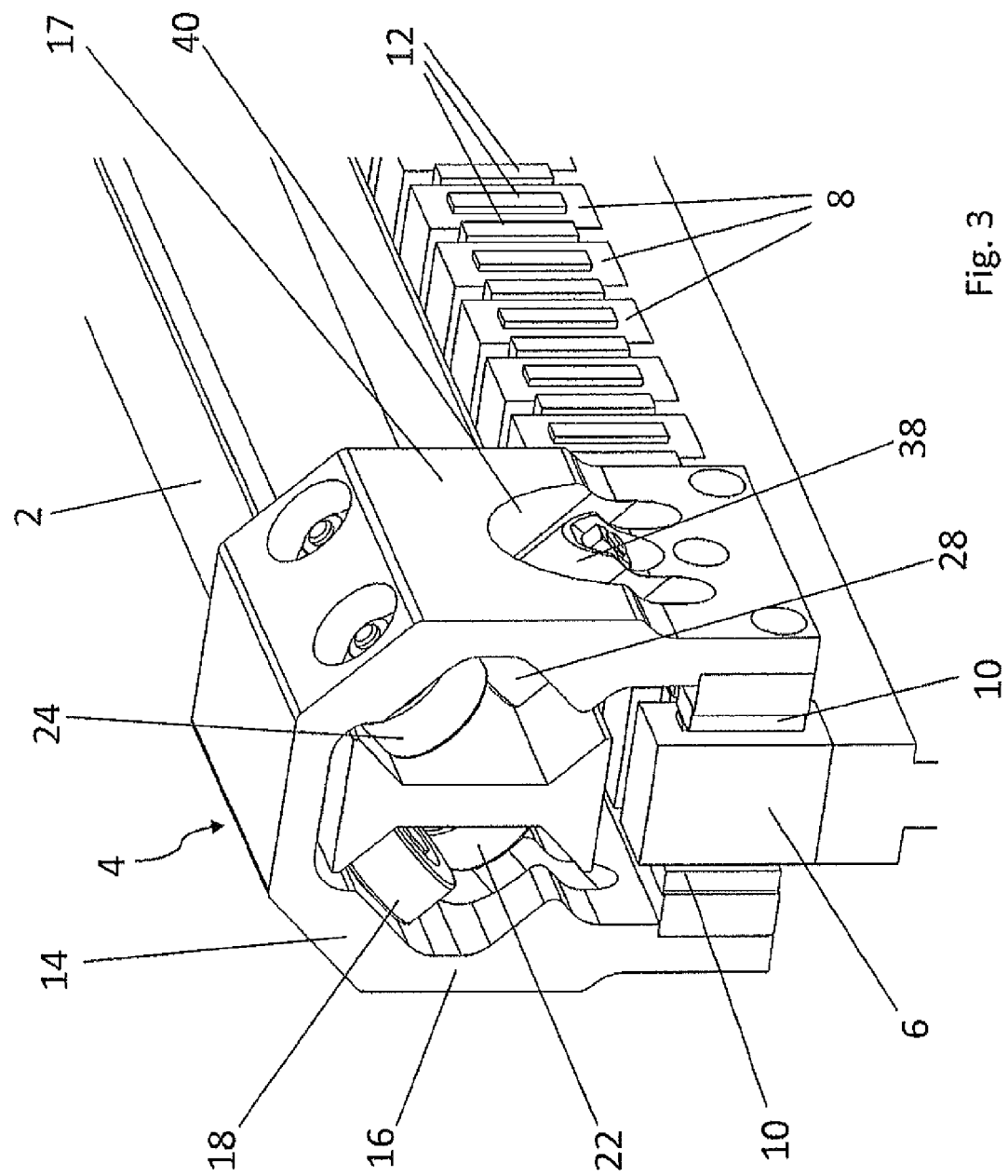
FIG. 3 is a perspective schematic view of a straight section of the transport device of FIG. 1.
Figure 4:
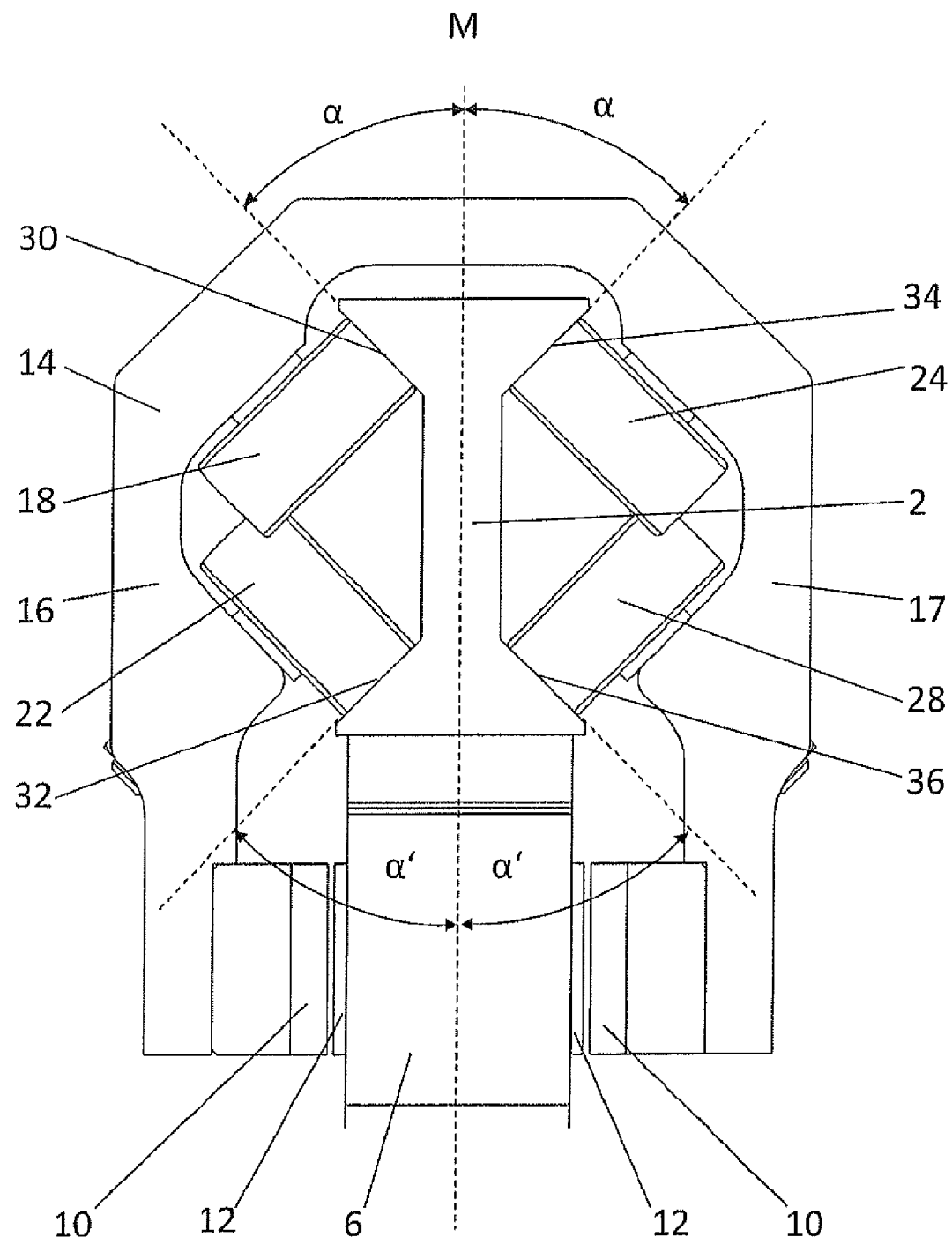
FIG. 4 is a schematic cross-sectional view of the carriage of FIG. 1, supported on the guide rail.
Figure 5:
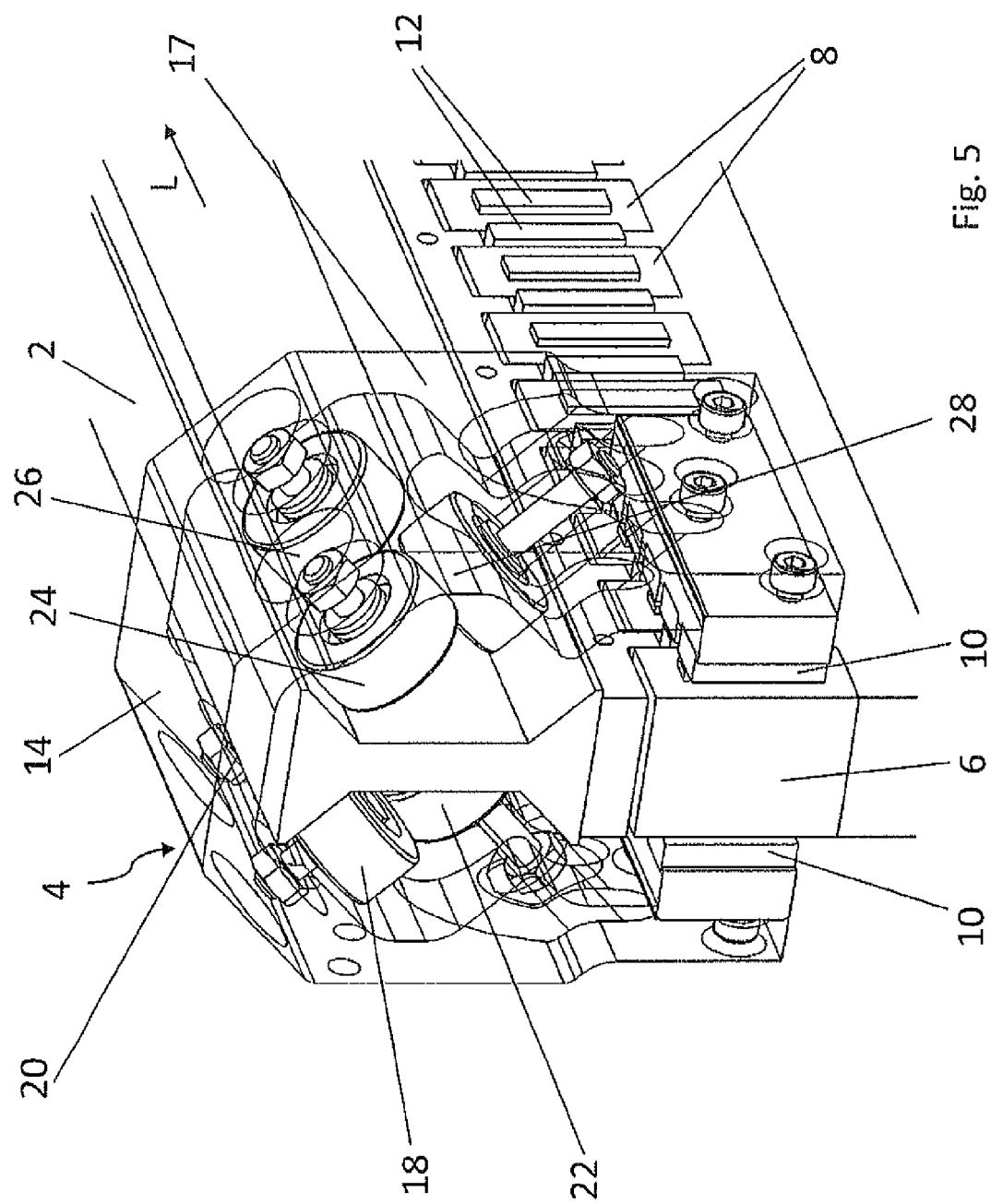
FIG. 5 is a perspective view of the carriage of FIG. 4 with a transparently rendered base body.

A linear-motor drive device 6, which is usually configured as an array of motor coils, is used to drive the at least one carriage 4. The linear-motor drive device 6 comprises many coils 8 arranged in a row (see FIG. 2), preferably of copper, which can be supplied individually with current. The carriages 4, as can be seen in FIGS. 3 and 4, comprise in turn at least two permanent magnets 10, which interact with the linear-motor drive device 6. The support and guidance of the carriage 4 along the guide rail 2 is provided by a plurality of running rollers, which will be discussed in greater detail below. These running rollers are preferably made of plastic.

When current is supplied to a coil 8, local magnetic fields are formed, and thus a flow of force is created between the coil 8 and the permanent magnets 10. By controlling the supply of current to the individual coils 8 intelligently, a moving magnetic field can be generated, which can move each individual carriage 4 independently of the other carriages 4. Because of the permanent magnets 10 arranged on both sides of, and next to, the linear-motor drive device 6, the direct action of the force between each coil 8 and the permanent magnets 10 is theoretically neutralized, and what remains is only a drive force, which acts on the carriage 4.

The greatest attractive force is present between the permanent magnets 10 and the stator teeth 12 between the coils 8. The ferrous stator teeth 12 have the function of increasing the density of the magnetic field. In theory, the linear-motor drive device 6 could also be built out of nonferrous materials, but this would decrease the achievable drive force.

As is clear from FIGS. 1 to 4, the linear-motor drive 6 in the example shown is situated inside the oval shape defined by the guide rail 2 and comprises a similar oval shape.

Each carriage 4, therefore, can execute both motion in a straight line and motion along a curve. Through a combination of straight and curved sections, paths of any desired shape can be realized in addition to the oval path form of the guide rail 2 shown in FIG. 1. Many other configurations are also possible.

Nevertheless, the path form shown here is advantageous to the extent that, in the curves, the movement occurs in the form of a modified clothoid. The curved path is of constant curvature, and the first and second derivatives of the curvature are also constant. In this way, the abrupt changes in angular velocity and centrifugal force which would otherwise occur at the start and end of the curve are avoided. This leads to an increase in the service life of the running rollers, and the vibrations transmitted to the overall system are reduced.

Because of the symmetrical structure of the carriages 4 and the guide rail 2 relative to a longitudinal center plane M (FIG. 4) of the transport device, the force of each coil 8 acting directly on the permanent magnets 10 should be neutralized, as already mentioned above. If, however, the gap between the coil 8 and the permanent magnets 10 becomes smaller on one side, a direct force component between the coil 8 and the permanent magnets 10 would arise. As a result of manufacturing tolerances and dynamic deformations, it must be assumed that the width of the gap will vary and that transverse forces will therefore act on the carriage 4. For this reason, the carriage 4 must be supported in very sturdy fashion in order to keep the gap between the coil 8 and the permanent magnets 10 as constant as possible on both sides.

This sturdy support is described in greater detail below with reference to FIGS. 3 to 6. The carriage 4 comprises a substantially horseshoe-shaped or inverted U-shaped base body 14, from the sidepieces 16, 17 of which the running rollers 18, 20, 22, 24, 26, 28 inwardly project. The at least two permanent magnets 10 are arranged on the inside surface of the ends of the sidepieces 16, 17 and enclose the linear-motor drive device 6 from both sides in plane-parallel fashion. Several permanent magnets 10 are preferably provided on each side of the carriage 4.

The six running rollers 18, 20, 22, 24, 26, 28 rest on a total of four guide surfaces 30, 32, 34, 36 of the guide rail 2 and roll along them as the carriage 4 moves. The half of the carriage 4 which is on the left in FIG. 4 relative to the longitudinal center plane M thus comprises three rollers 18, 20, 22, wherein the first two running rollers 18, 20 rest on the first guide surface 30, and the third running roller 22 rests on the second guide surface 32. In similar fashion, the half of the carriage on the right relative to the longitudinal center plane M comprises three running rollers 24, 26, 28, the two first running rollers 24, 16 resting on a first guide surface 34, the third running roller 28 on a second guide surface 36.

Each guide surface 30, 32, 34, 36 of each side wall is arranged at an acute angle α, α' to the longitudinal center plane M, so that the two guide surfaces 30, 32; 34, 36 of each side wall are at an angle of 80° to 100° to each other. The acute angle α, α' between each of the guide surfaces 30, 32, 34, 36 and the longitudinal center plane M is preferably 40° to 50°, and more preferably substantially 45°. Accordingly, it is also advantageous for the two guide surfaces 30, 32; 34, 36 of each side wall to be at an angle of substantially 90° to each other.

The three running rollers 18, 20, 22; 24, 26, 28 of each half of the carriage are therefore arranged at a slant. More accurately, they are configured in a tilted triangular arrangement, wherein the two first running rollers 18, 20; 24, 26 have parallel rotational axes, whereas the third running roller 22; 28 has a rotational axis tilted at an angle of 80° to 100°, and preferably of 90°, to the rotational axes of the first two running rollers 18, 20; 24, 26. As can be seen especially clearly in FIG. 5, the third running roller 22; 28 of each half of the carriage is arranged precisely in the middle between the two other running rollers 18, 20; 24, 26 relative to the longitudinal direction (arrow L) of the transport device, so that a triangular arrangement of the isosceles type, possibly even of the equilateral type, is obtained.

As can be seen best in FIG. 4, the two guide surfaces 30, 32; 34, 36 of each side wall of the guide rail 2 are a certain distance apart and face each other. The guide rail 2 thus has a double-T profile with slanted guide surfaces 30, 32, 34, 36 on the outside walls of the double-T-shaped beam.

Figure 6:
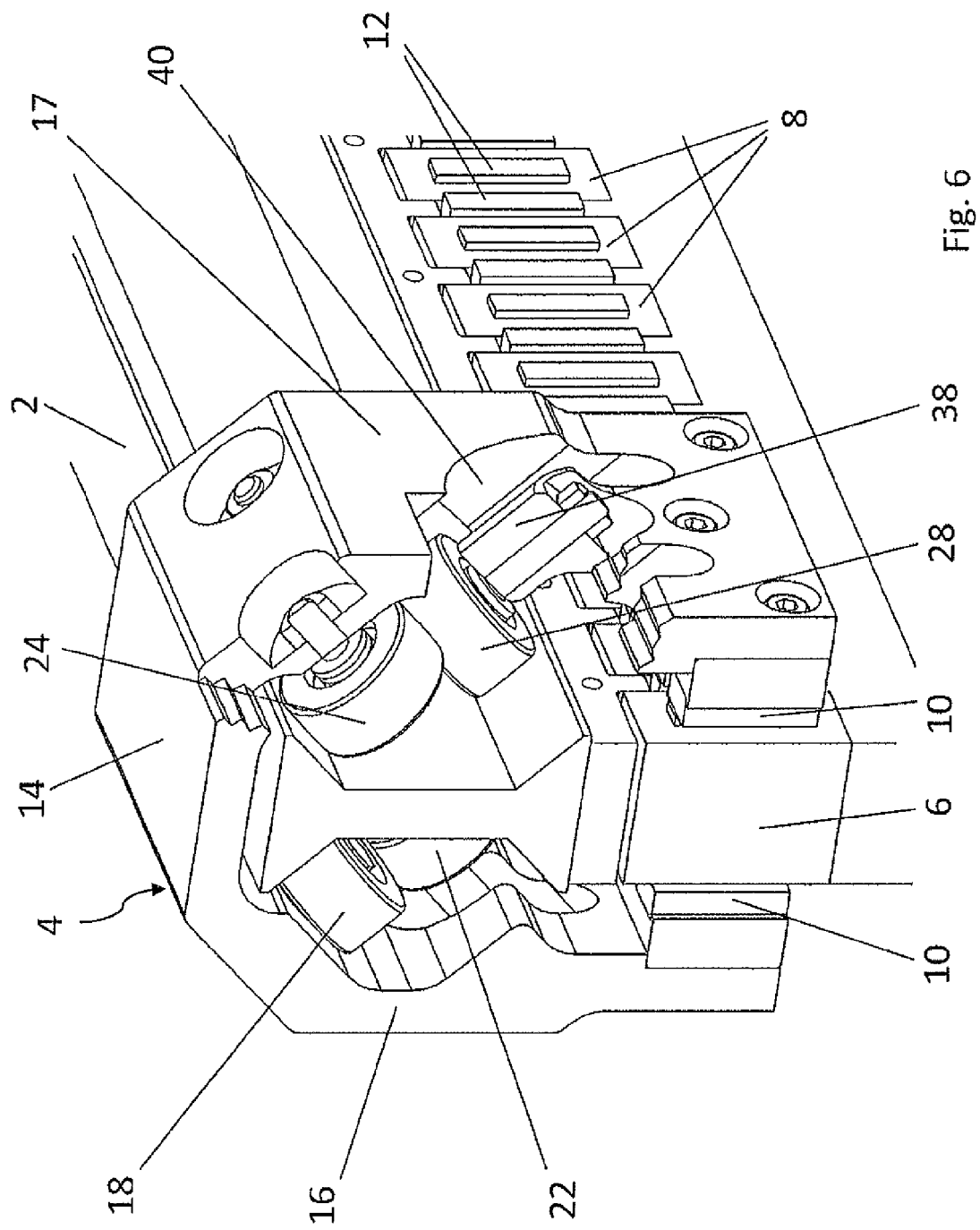
FIG. 6 is a perspective view of the carriage of FIG. 4 with a partially cut-away base body.

As is easiest to see in FIGS. 3 and 6, finally, the two first running rollers 18, 20; 24, 26 of each half of the carriage are supported rotatably on the base body 14 of the carriage 4. In contrast, the third running roller 22, 28 of each half of the carriage is supported rotatably on a web 38, which is surrounded by an inverted U-shaped recess 40, which is formed in a middle section of each of the sidepieces 16, 17 of the base body 14.

This arrangement serves to provide an elastic support for the third running rollers 22, 28. The elastic support is realized here by way of an intentional weakening of the sidepieces 16, 17. The spring constant changes with the size and shape of the recess 40 around the webs 38. The dimensions of the recess 40 are therefore to be calculated in correspondence with the desired spring constant. In the case of the present example, the rotational axes of the third running rollers 22, 28 in the relaxed state are tilted inward, so that, when the carriage 4 is positioned on the guide rail 2, in which position the third running rollers 22, 28 are perpendicular to their associated second guide surfaces 32, 36, the running rollers assume a pretensioned state and are thus pressed slightly against this guide surface 32, 36. As result, it is possible to keep the running rollers 18, 20, 22, 24, 26, 28 free of play at all times.

The pretension is produced by the effective use of the stiffness of the structural component. As a result, there is no need for any additional parts such as springs, and there is no need to adjust the position of the running rollers.

The invention claimed is:

1. A transport device for conveying products comprising:
at least one movable carriage for conveying a product;
a stationary, endless guide rail for guiding the at least one carriage; and
a linear-motor drive device for driving the at least one carriage;
wherein the at least one carriage comprises at least two permanent magnets, which interact with the linear-motor drive device; and
wherein the at least one carriage further comprises a plurality of running rollers, which rest on first and second guide surfaces of the guide rail arranged on different planes and roll along the first and second guide surfaces when the at least one carriage moves;
wherein the at least one carriage comprises first and second halves, mirror-symmetric to a longitudinal center plane of the transport device, each of the first and second halves comprising three running rollers, wherein the three running rollers of the first half of the at least one carriage rest on two first and second guide surfaces on a first side wall of the guide rail, and the three running rollers of the second half of the at least one carriage rest on two other first and second guide surfaces on a second side wall of the guide rail;
wherein, during movement of the at least one carriage, the three running rollers of the first half of the at least one carriage roll along the first and second guide surfaces on the first side wall of the guide rail, and the three running rollers of the second half of the at least one carriage roll along the first and second guide surfaces on the second side wall of the guide rail;
wherein the first and second guide surfaces of each of the first and second side walls are at an angle of 80° to 100° to each other, wherein the first and second guide surfaces of each of the first and second side walls of the guide rail are spaced apart and face each other; and
wherein the at least one carriage comprises a substantially horseshoe-shaped or inverted U-shaped base body having sidepieces, from which sidepieces the running rollers inwardly project;
wherein the at least one carriage and the guide rail are symmetric relative to the longitudinal center plane; and
wherein the first guide surface and the second guide surface of each of the first and second side walls of the guide rail are arranged at an acute angle to the longitudinal center plane, wherein the acute angle between each of the first and second guide surfaces and the longitudinal center plane is 40° to 50°.

2. The transport device according to claim 1, wherein the three running rollers of each of the first and second halves of the at least one carriage are configured in a tilted triangular arrangement, wherein two running rollers have parallel rotational axes and rest on the first guide surface, and wherein the third running roller has a rotational axis tilted at an angle of 80° to 100° to the rotational axes of the first two running rollers and rests on the second guide surface.

3. The transport device according to claim 1, wherein the two guide surfaces of each of the first and second side walls are at an angle of substantially 90° to each other.

4. The transport device according to claim 3, wherein the acute angle between each of the first and second guide surfaces and the longitudinal center plane is substantially 45°.

5. The transport device according to claim 1, wherein the third running roller of each half of the at least one carriage is arranged precisely in the middle between the two other running rollers relative to the longitudinal direction.

6. The transport device according to claim 1, wherein the at least two permanent magnets are arranged toward an end of the sidepieces on an inside surface of the sidepieces.

7. The transport device according to claim 1 or claim 6, wherein the two first running rollers of each half of the at least one carriage are supported rotatably on the base body of the at least one carriage, and the sidepieces of the base body comprise, in a middle section thereof, a U-shaped recess forming a web, on which the associated third running roller is supported.

* * * * *